United States Patent
Hayati

(10) Patent No.: US 6,426,083 B1
(45) Date of Patent: Jul. 30, 2002

(54) AQUEOUS BORATE-CONTAINING COMPOSITIONS AND THEIR PREPARATION

(75) Inventor: Igan Hayati, Slough (GB)

(73) Assignee: U.S. Borax Inc., Valencia, CA (US)

( * ) Notice: Subject to any disclaimer, the term of this patent is extended or adjusted under 35 U.S.C. 154(b) by 0 days.

(21) Appl. No.: 09/529,867

(22) PCT Filed: Oct. 22, 1998

(86) PCT No.: PCT/GB98/03161

§ 371 (c)(1),
(2), (4) Date: Apr. 20, 2000

(87) PCT Pub. No.: WO99/20565

PCT Pub. Date: Apr. 29, 1999

(30) Foreign Application Priority Data

Oct. 22, 1997 (GB) .............................................. 9722311

(51) Int. Cl.$^7$ .............................................. A01N 25/26
(52) U.S. Cl. ........................ 424/421; 424/400; 424/405; 424/409; 424/484; 424/485; 424/486; 424/76.3; 424/657; 424/658; 424/659; 424/660; 71/63; 71/64.09; 423/184; 423/201; 423/277; 423/278
(58) Field of Search ................................. 424/400, 405, 424/409, 421, 484–486, 76.3, 657–660; 71/63, 64.09; 423/184, 201, 277, 278

(56) References Cited

U.S. PATENT DOCUMENTS 5,502,082 A * 3/1996 Umger et al. ................ 521/141
5,746,957 A * 5/1998 Fanelli et al. ................ 264/109

* cited by examiner

Primary Examiner—Neil S. Levy
(74) Attorney, Agent, or Firm—Kurt R. Ganderup

(57) ABSTRACT

The invention relates to aqueous boron-containing compositions and their preparation. In particular the invention provides self-structured aqueous sodium pentaborate gels. The gels according to the invention may be prepared by reacting boric acid or boric oxide and sodium tetraborate or metaborate in suspension in water and under mixing such that a self-structured sodium pentaborate gel is formed. The gels according to the invention are physically stable and are easily handled.

12 Claims, No Drawings

AQUEOUS BORATE-CONTAINING COMPOSITIONS AND THEIR PREPARATION

This invention relates to aqueous boron-containing compositions and their preparation.

Borate-containing compositions have various applications in industry, e.g. in the vitreous, agriculture and wood preservatives fields as well as in fire retardant applications. Conventionally the borate has been provided in granular form and, particularly for application by spraying, it has been necessary to dissolve the granules, requiring heating before application.

Aqueous borate suspension formulations have been proposed for the treatment of timber. Thus AU-A-574389 proposes the use of a preservative composition comprising a colloidal micro-crystalline suspension of boron salts and a thickening agent, which serves to maintain the stability of the suspension. The particles of the colloidal micro-crystalline suspension are observed to be of the order of 15 to 30 microns. Similarly EP-A-0289317 describes timber preservative compositions comprising a boron-containing preservative, which may be a micro-crystalline suspension e.g. 10 to 30 microns, and a thickening agent, such as the polysaccharide xanthan gum.

The above preservative compositions were prepared by heating, dissolving and rapid cooling of the ingredients followed by the addition of a thickening agent such as xanthan gum. The resulting compositions are not self-structured as indeed is evidenced by their need always to employ thickening agents.

According to one aspect of the present invention, there is provided a self-structured aqueous sodium pentaborate gel.

It has surprisingly been found that it is possible to provide sodium pentaborate in the form of a self-structured gel, i.e. a gel which does not require thickening agents as suspension aid for the particles. The gels according to the present invention may be readily prepared, are physically stable and can be easily handled. The gels may be pumpable and readily diluted for application as required.

The gels according to the invention comprise sodium pentaborate particles in saturated aqueous solution.

The gels according to the invention can have a high solids contents e.g. up to about 80% by weight, preferably of the order of 60 to 70% by weight. If the solids content becomes too high, the gel may become too stiff for practical use.

The gels according to the present invention may have a high borate content, e.g. 8 to 13% by weight boron as sodium pentaborate but may still be readily handleable, in that the gel is pumpable and can readily be diluted by addition of water. Preferably the gels contain 9 to 12% by weight, most preferably approximately 10% by weight, boron as sodium pentaborate.

The gel according to the invention comprises fine sodium pentaborate particles within a saturated aqueous solution. To produce a self-structured gel, at least a substantial number of the particles must be below 10 microns in size, preferably in the range 0.1 to 10 microns, and more preferably below 5 microns (e.g. 0.1 to 5 microns) in size.

In some circumstances, however, a pourable product having a boron concentration of at least about 12%, may be desired. In these cases, the products of the invention may contain particles the majority of which will still generally be below 10 microns, but the remainder may be larger in size, e.g. up to 50 e.g. 40 microns in size.

The compositions according to the present invention are easy to disperse in aqueous media and have a fast dissolution rate at ambient temperatures and also under field conditions in which the temperature of the water may be as low as 5° C., such as may be encountered in agriculture or wood treatment conditions. Moreover, even with high boron contents, the compositions are physically stable and pumpable.

On standing for long periods, there may be some syneresis, i.e. some liquid may separate from the gel. This is unlikely to present any problem as homogeneity can readily be restored by simple mixing.

Syneresis may be reduced by adding an anti-settling agent by techniques well known to those skilled in the art. Anti-settling agents may be selected from high molecular weight polymers, hydroxyethyl cellulose, cross-linked polyacrylates, bentonite gels, silica and combinations of these.

The mechanism of the gel system according to the invention is not fully understood. However it is thought to be caused by the weak attraction of the particles by Van der Waals forces. This is demonstrated by the thixotropic nature of the compositions. Upon shearing the sample and removal of the shear force sol/gel transformation occurs. The gels according to the invention may generally be described as flocculated. Using a rotational viscometer, the flow caurve of shear stress v shear rate, performed in a cycle (whereby the shear rate was increased to 200 $sec^{-1}$ and then reduced to 0) showed hysteresis with the reduction in shear (descending) curve being below the increase in shear (ascending) curve.

The gels according to the invention can be stable at temperatures between −10° C. and 60° C. depending on their composition. The gels can be recovered from the frozen state i.e. they have freeze/thaw stability.

The gel according to the invention may be readily handleable and does not suffer from the disadvantages of fines, dust, caking and segregation which are encountered with solid products. Moreover the pumpable gel according to the invention can be accurately metered.

The gel is self-structured. If desired, the gel may contain additives, for example micronutrient fertilisers, herbicides, fungicides and insecticides.

The borate-containing compositions according to the present invention may be of high density. For example a gel of sodium pentaborate crystals having an equivalent of 10% boron by weight may have a density of the order of 1.3 g/cc.

The gels according to the present invention may be prepared by reacting boric acid or boric oxide and sodium tetraborate or sodium metaborate in suspension in water and under mixing.

According to a second aspect of the present invention, there is provided a method of preparing a self-structured sodium pentaborate gel, which method comprises reacting boric acid or boric oxide and sodium tetraborate or sodium metaborate in suspension in water and under mixing such that there is formed a self-structured sodium pentaborate gel.

The borax and/or sodium metaborate will generally be used in hydrated form, e.g. $Na_2B_4O_7 \cdot 5$ or $10H_2O$ and $NaBO_2 \cdot 4H_2O$.

The starting materials react with the formation of sodium pentaborate precipitate, the particles of which under the influence of the mixing are sufficiently small (usually less than 10 microns) that a self-structured gel is formed.

The starting materials may for example be in dry crystalline form or wet, such as a wet filter cake or wet product obtained following centrifugation in the production of borate, e.g. boric acid or borax, by processes well known in the art. In addition, there may be used plant liquors prom borate production processes. These liquors thus provide the water for the preparation method as well as some of the starting materials. Generally speaking the particle size of the starting materials is not critical.

Three variables which particularly contribute to the production of a self-structured gel are rate of agitation, concentration of the solid ingredients and the temperature used. However, there is a proviso that the solid ingredients should not be allowed fully to dissolve. This allows nucleation to take place readily.

Agitation can be low speed or high speed depending on the solids concentration. Generally the higher the concentration is, the less intense the mixing. Slow agitation tends to give particles having a coarser nature which can contribute to a pourable product.

The temperature will generally be ambient up to near boiling point, e.g. 90° C., preferably up to 60° C. The use of elevated temperature tends to reduce mixing times.

It is often preferred to use high speed mixing, high concentration and high temperature (normally up to about 60° C. but possibly up to 90° C.). Low speed mixing generally gives a product with coarser particles and takes longer to form but the product is pourable.

The starting materials are preferably used in stoichiometric amounts for sodium pentaborate. However the molar ratio of $B_2O_3:Na_2O$ may for example be 3:1 to 8:1. The materials used to achieve these ratios would be selected from boric acid, boric oxide, sodium tetraborate or sodium metaborate, with boric acid and borax pentahydrate being preferred. If one of the reactants is in excess, excess unreacted material will generally be present in the resulting gel, and some coarse granules may be retained in the product.

It may be advantageous to carry out the gel formation reaction, in the presence of previously made gel, to act as seed crystals. In this way a significant reduction in the preparation time is achieved. Typically, seed crystals represent from 10% to 50% by weight of the final product.

According to a further aspect of the present invention, there is provided a method of preparing a self-structured sodium pentaborate gel, which method comprises adding agglomerated water-soluble sodium pentaborate particles comprising boric acid, borax pentahydrate and sodium pentaborate to water and mixing such that there is formed a self-structured sodium pentaborate gel. In this method the boric acid and borax pentahydrate react with the sodium pentaborate acting as seed crystals in the production of the gel.

The starting agglomerated particles may be obtained by the process described in WO-A-93/17963. Such particles may be obtained commercially, e.g. under the trade mark SOLUBOR DF. Again the intensity of the mixing and the temperature employed will depend upon each other and the concentration. However the material must not be allowed fully to dissolve.

As mentioned above, it may be advantageous to have some larger crystals present in the gel according to the invention. Such gels can be obtained by the methods described above whereby the reactants are heated to dissolve a part (but not all) of the sodium pentaborate. On cooling some larger crystals (but less than 50, e.g. less than 40, microns in size) are formed.

The gels according to the present invention may be applied, e.g. in the agriculture fields, in timber treatment and in fire retardants, as such or following dilution.

The invention is further illustrated by reference to the following Examples.

EXAMPLE 1

Boric acid ($H_3BO_3$) technical grade (224 g) was mixed with borax pentahydrate ($Na_2B_4O_7.5H_2O$-176 g) and water previously heated to about 50° C. (260 g) in a Silverson mixer having a disintegrator head and operating at about 3,000 rpm. Mixing was continued for a period of 10 minutes.

The resulting product is a self-structured gel comprising 10% of boron as crystals of sodium pentaborate having particle sizes of generally less than 10 microns and density of 1.3 g/cc.

EXAMPLE 2

50 g of the product from Example 1 was placed in a Silverson mixer as described above as seed and water (65 g) was added along with boric acid (56 g) and borax pentahydrate (44 g). The mixture was stirred at 3000 rpm for 5 minutes.

The resulting product was a gel having the same properties as the product of Example 1.

EXAMPLE 3

A suspension comprising 57 parts by weight of Solubor DF in water was mixed gently at approximately 150 rpm for 15 minutes using a Heidolph stirrer.

The resulting product was a gel having the same properties as the product of Example 1.

EXAMPLE 4

Boric acid technical grade (56 g) was mixed with borax pentahydrate (44 g) in water (65 g) previously heated to 40° C. using a Silverson mixer operating at about 3,000 rpm and placed on a hot plate at 150° C. The heat was switched off as soon as mixing started.

A gel having the same properties as the product of Example 1 formed after 5 mins when the temperature had reached 53° C.

EXAMPLE 5

Boric acid technical grade (560 g), borax pentahydrate (440 g) and water (650 g) previously heated to 40° C. were well dispersed by hand and then mixed using a Silverson mixer operating at about 3,000 rpm.

A gel having the same properties as the product of Example 1 formed after 12 mins.

EXAMPLE 6

A mixture of 50 g of the product of Example 1, water (65 g), boric acid (56 g) and borax pentahydrate (44 g) was placed on a hot plate at and stirred gently at 100 rpm.

A gel having the same properties as the product of Example 1 formed after 15 minutes, when the temperature reached 60° C.

EXAMPLE 7

Boric acid technical grade (64 g) (in stoichiometric excess), borax pentahydrate (44 g) and water (65 g) previously heated to 40° C. were mixed using a Silverson mixer at about 3,000 rpm on a hot plate were heated to 70° C. for 4.5 mins.

The mixture was observed to become creamy in consistency and then to become thinner.

The mixture was cooled with stirring on a Heidolph stirrer at 100 rpm for 0.5 hours and then on a Silverson at 3,000 rpm for 1 minute.

A pourable self-structured gel product containing 12% by weight boron was obtained.

EXAMPLE 8

Boric acid technical grade (112 g), borax pentahydrate (88 g) and water (52 g) were stirred at rpm on a hot plate brought to 90° C.

The mixture had a creamy consistency at 60° C. and then thinner at 80° C.

The mixture thickened on cooling with gentle stirring with a Heidolph stirrer.

The resulting self-structured gel containing 13% by weight boron contained a majority of particles below 10 microns and some below 40 microns.

EXAMPLE 9

Boric acid (280 g) followed by borax pentahydrate (220 g) was added to stirred near boiling water (248 g). The mixture was stirred with high agitation to mix the ingredients then stirring was slowed to 100 rpm and continued for a period of 15 minutes. The mixture was then stirred at 3,000 rpm for 2 minutes.

A pourable self-structured gel product containing 11% by weight boron was obtained.

EXAMPLE 10

Boric acid (224 g) and borax pentahydrate (176 g) were added consecutively to stirred near boiling water (260 g) in a Silverson mixer operating at 3,000 rpm. Stirring was continued for a period of four minutes.

A gel having the same properties as the product of Example 1 was formed.

What is claimed is:

1. A self-structured aqueous sodium pentaborate gel comprising sodium pentaborate particles in a saturated aqueous solution and containing 8 to 13% by weight boron.

2. A method of preparing a self-structured sodium pentaborate gel, which method comprises reacting a reaction mixture of solid ingredients comprising boric acid or boric oxide and sodium tetraborate or sodium metaborate in suspension in water and under mixing such that the solid ingredients are not fully dissolved, thereby forming as final product, a self-structured sodium pentaborate gel comprising sodium pentaborate particles in a saturated aqueous solution.

3. A gel according to claim 1 which contains 9 to 12% by weight boron as sodium pentaborate.

4. A gel according to claim 1 which contains approximately 10% by weight boron as sodium pentaborate.

5. A method according to claim 2 having a $B_2O_3:Na_2O$ molar ratio of 3:1 to 8:1 in the reaction mixture.

6. A gel according to claim 1 in which the sodium pentaborate particles are below 10 microns in size.

7. A gel according to claim 6 in which the sodium pentaborate particles are below 5 microns in size.

8. A gel according to claim 1 which also contains a micronutrient fertilizer, herbicide, fungicide or insecticide.

9. A gel according to claim 1 which also contains an anti-settling agent.

10. A method according to claim 2 in which previously made gel is added as seed crystals in an amount of 10% to 50% by weight of the final product.

11. A method according to claim 2 in which the reaction mixture is heated to dissolve a part (but not all) of the sodium pentaborate and allowed to cool with the formation of larger size crystals.

12. A method of preparing a self-structured sodium pentaborate gel, which method comprises adding agglomerated water-soluble particles comprising boric acid, borax pentahydrate and sodium pentaborate to water and mixing such that the particles are not fully dissolved thereby forming a self-structured sodium pentaborate gel comprising sodium pentaborate particles in a saturated aqueous solution.

* * * * *